United States Patent [19]

Matsuoka

[11] 4,405,155

[45] Sep. 20, 1983

[54] SEAT BELT DEVICE FOR AN AUTOMOTIVE VEHICLE

[75] Inventor: Hideoki Matsuoka, Yokohama, Japan

[73] Assignee: Nissan Motor Co., Ltd., Kanagawa, Japan

[21] Appl. No.: 273,049

[22] Filed: Jun. 12, 1981

[30] Foreign Application Priority Data

Jul. 25, 1980 [JP] Japan .................... 55-105972[U]

[51] Int. Cl.³ ............................................ A62B 35/00
[52] U.S. Cl. ................................... 280/802; 280/808; 297/483
[58] Field of Search ............... 280/802, 808; 297/468, 297/469, 483, 473

[56] References Cited

U.S. PATENT DOCUMENTS

| | | | |
|---|---|---|---|
| 3,810,657 | 5/1974 | Campbell | 280/150 SB |
| 3,829,123 | 8/1974 | Holka | 280/150 SB |
| 4,084,841 | 4/1978 | Hayashi | 280/802 |
| 4,258,933 | 3/1981 | Takada | 280/808 |
| 4,312,539 | 1/1982 | Takada | 297/468 |

FOREIGN PATENT DOCUMENTS

| | | | |
|---|---|---|---|
| 2531227 | 2/1977 | Fed. Rep. of Germany | 280/150 SB |
| 2343627 | 10/1977 | France | 280/150 SB |
| 2396556 | 2/1979 | France | 280/150 SB |

Primary Examiner—David M. Mitchell
Assistant Examiner—Joseph G. McCarthy
Attorney, Agent, or Firm—Schwartz, Jeffery, Schwaab, Mack, Blumenthal & Koch

[57] ABSTRACT

A seat belt device used for a two-door automotive vehicle in which the seat back of the front seat is tilted forward whenever the passenger taking the rear seat gets out of the passenger compartment. In the seat belt device according to the present invention, since the seat belt is moved frontward along the side surface of the seat cushion by the use of a link mechanism, when the seat back is tilted forward, it is possible to open or close the vehicle side door smoothly without pinching the seat belt between the seat cushion and the seat back.

1 Claim, 8 Drawing Figures

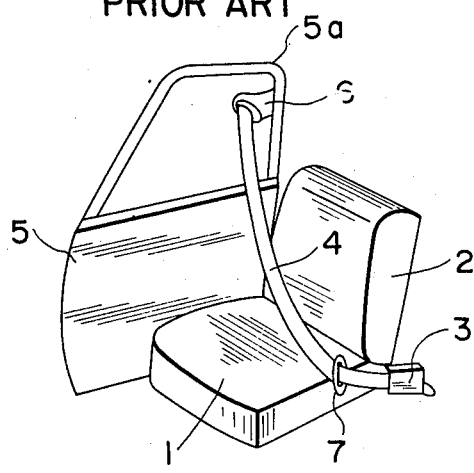
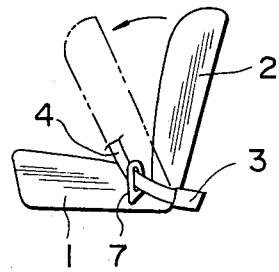
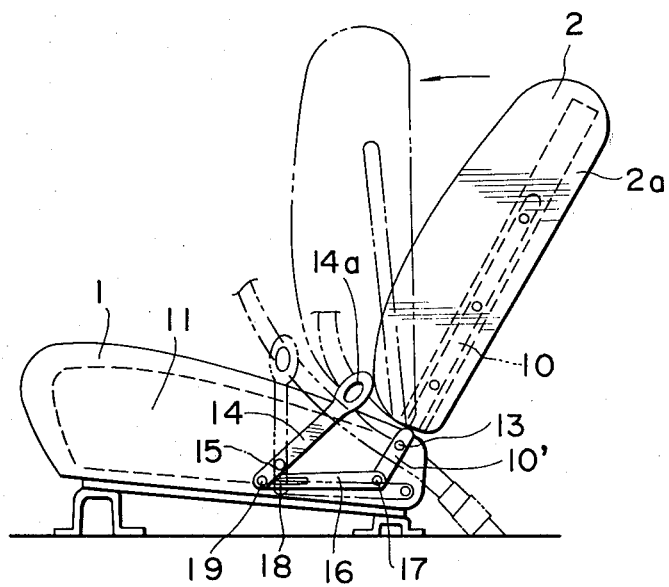

SEAT BELT DEVICE FOR AN AUTOMOTIVE VEHICLE

BACKGROUND OF THE INVENTION

1. Field of the Invention

The present invention relates generally to a seat belt device for a two-door automotive vehicle, and more particularly to a seat belt guide member provided for a seat so designed as to be able to move the seat belt along the side surface of the seat cushion of the front seat frontward and horizontally, when the seat back of the front seat is tilted forward, in order that it is possible to open or close the vehicle side door smoothly without pinching the seat belt between the seat cushion and the seat back.

2. Description of the Prior Art

The background of the present invention will be explained with respect to its application to the seat belt device used with an automotive vehicle.

As is well-known, there have been various safety seat belt device used for an automotive vehicle so as to protect a driver or passengers seated within the passenger compartment from injury caused by a shock when the vehicle is suddenly decelerated in an emergency such as in a collision. Normally, the seat belt can be reeled out easily from a retractor by the driver or passenger and is biased to be reeled within the retractor so that the seat belt may be brought into contact with the body of the driver under an appropriate tension. In the case where an automatic locking retractor is provided for the seat belt device, the seat belt is locked or stopped from being further reeled out from the retractor in case an extraordinary shock is given to the retractor. This is because an inertia-sensitive sensor can detect the shock and lock the seat belt so that that seat belt can be prevented from being further reeled out from the retractor.

The present invention relates to a seat belt device provided for a front seat whose seat back can be tilted forward, in which one end of the seat belt is fixed to a retractor provided on the middle side of the seat frame and the other end thereof is fixed to the door side so as to protect the driver's body, contacting the hips and the shoulder.

In the seat belt device as described above, when the seat back is tilted forward and the door is opened by the rear seat passengers in order to get out of the passenger compartment, since the seat belt is reeled out of the retractor, the belt does not properly fit the front seat driver or passenger.

In addition to the above shortcomings, when the seat back is tilted forward, since the belt is pinched between the seat cushion and the seat back, it is difficult to reel the belt out from the retractor smoothly because a strong frictional force is applied to the belt; that is, it is difficult to open the side door smoothly.

The prior-art seat belt device will be described in more detail hereinafter with reference to the attached drawings under DETAILED DESCRIPTION OF THE PREFERRED EMBODIMENTS.

SUMMARY OF THE INVENTION

With these problems in mind therefore, it is the primary object of the present invention to provide a seat belt device such that the seat belt can be moved frontward and almost horizontally to the place where there is sufficient clearance between the seat cushion and the seat back to open the side door smoothly, when the seat back is tilted forward.

To achieve the above-mentioned object, the seat belt device according to the present invention comprises a belt guide member and a link mechanism to move the seat belt frontward automatically when the seat back is folded.

BRIEF DESCRIPTION OF THE DRAWINGS

The features and advantages of the seat belt device according to the present invention will be more clearly appreciated from the following description taken in conjunction with the accompanying drawings in which like reference numerals designate corresponding elements and in which:

FIG. 1 is a diagrammatic pictorial view of a prior-art seat belt device with a seat belt;

FIG. 2 is a diagrammatic view showing the case when the seat back of FIG. 1 is tilted halfway forward;

FIG. 3 is a side view showing a first embodiment of the seat belt device according to the present invention;

DETAILED DESCRIPTION OF THE PREFERRED EMBODIMENTS

Figure 4:
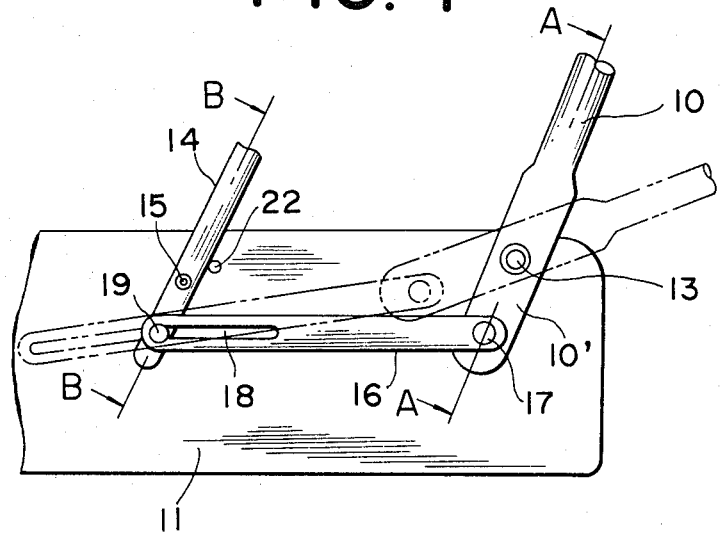
FIG. 4 is an enlarged fragmentary side view showing the main link mechanism of FIG. 3.

To facilitate understanding of the present invention, a brief reference will be made to a prior-art seat belt device, with reference to the attached drawings.

In FIGS. 1 and 2, the reference numeral 1 denotes a seat cushion of a front seat for a two-door automotive vehicle and the numeral 2 denotes a seat back the lower part of which is rotatably supported so as to be tilted forward when the passengers on the rear seats get in or out of the vehicle, as depicted in FIG. 2. The numeral 3 denotes a retractor for a seat belt 4 provided in the center of the passenger compartment. One end of the seat belt 4 is pulled out of the retractor, and the other end thereof is connected to a bracket 6 fixed on the upper rear part of the door frame 5a of the side door 5.

A belt guide member 7 is fixed on the inside surface of the seat cushion 1 so that the seat belt 4 can be reeled out smoothly.

In the seat belt device as described above, however, when the seat back 2 is tilted forward and the door 5 is opened by the rear seat passengers to get out of the passenger compartment, since the seat belt 4 is reeled out of the retractor 3, the belt 4 does not properly fit the front seat driver or passenger. In this case, when the door 5 is closed, since the retractor 3 pulls the seat belt 4 thereinto, the belt is properly fitted to the driver or passenger.

In addition, when the seat back 2 is tilted forward by the rear seat passenger, since the seat belt 4 is pinched between the seat cushion 1 and the seat back 2 regardless of the presence of the belt guide member 7, as depicted by the dot-dot-dashed lines in FIGS. 2, it is difficult to reel the seat belt 4 out from the retractor 3 because a strong frictional force is applied to the seat belt 4, that is, it is difficult to open the door smoothly.

In view of the above description, reference is now made to a first embodiment of the seat belt device according to the present invention.

Figure 5:
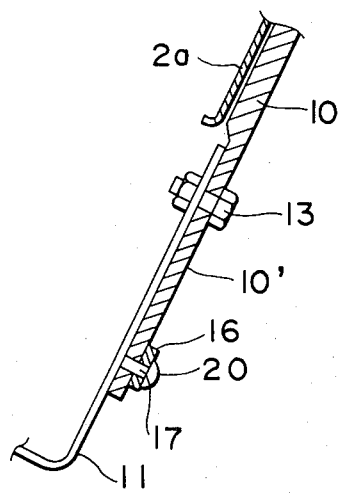
FIG. 5 is a fragmentary cross-sectional view taken along the lines A—A of FIG. 4.
Figure 6:
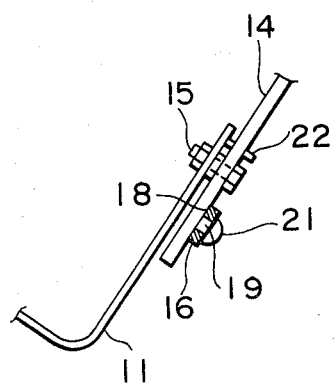
FIG. 6 is a fragmentary cross-sectional view taken along the lines B—B of FIG. 4.

FIG. 3 is a side view thereof, FIG. 4 is an enlarged fragmentary side view showing the link mechanism, and FIGS. 5 and 6 are two fragmentary cross-sectional view of FIG. 4.

In FIGS. 3-6, a movable rod 10 is fixed to a frame 2a of a seat back 2 extending downward along the outside of the frame 2a. Also, a belt guide member 14 having a guideway or guide portion 14a on the top thereof is rotatably supported by an axle 15 fixed on the frame 11 for the seat cushion 1. The movable rod 10 is rotatably supported by an axle 13 fixed to the frame 11 for the seat cushion 1.

At the lower part 10' of the movable rod 10 (below the axle 13), one end of a link lever 16 is rotatably connected to the movable rod 10 by a pin 17. This link lever 16 extends frontwardly, and a pin 19 is loosely fitted to a slot 18 provided on the front part of the link lever 16. This pin 19 is also fixed to the belt guide member 14 at the lower part below the axle 15 fixed to the frame 11 for the seat cushion 1. A link mechanism is thus constructed as described above. On the top of the above-mentioned pins 17 and 19, the respective flange portions 20 and 21 of FIGS. 5 and 6 are integrally formed therewith to prevent the link lever 16 from falling off therefrom. Further, in this embodiment, a stopper 22 is implanted in the frame 11 to restrict the movement of the belt guide member 14.

Operation is next described of the first embodiment of the present invention.

As shown in FIG. 3, when the seat back 2 is in the normal upright position, a guide portion 14a provided on the top of the belt guide member 14 is also tilted rearward to guide the seat belt 4 backward smoothly.

As shown by the dot-dot-dashed lines in FIG. 3, when the seat back 2 is tilted forward for a rear seat passenger to get in or out of the passenger compartment, the movable rod 10 is rotated counterclockwise with the axle 13 as its center in FIG. 3, and therefore the belt guide member 14 is also rotated counterclockwise, that is, frontward, via the link lever 16 with the axle 15 as its center as shown by the dot-dot-dashed lines in FIG. 3. As a result, the seat belt 4 is moved to a place in which there is clearance between the seat cushion 1 and the seat back 2, when the seat is tilted forward. Since the seat belt is not pinched therebetween, the door 5 can be opened or closed freely without any trouble caused by the seatbelt.

When the seat back 2 is returned backward to the original position, all the members are moved in the opposite direction, and the belt guide member 14 is also returned to the original position where the guide member 14 is brought into contact with the stopper 22. Further, in this embodiment, when the seat back 2 is further tilted backward, although the link lever 16 is moved further frontward as shown by the dot-dot-dashed lines in FIG. 4, since the pin 19 can be slidably moved within the slot 18, it is possible to prevent excessive force from being applied to the link lever 16.

Figure 7:
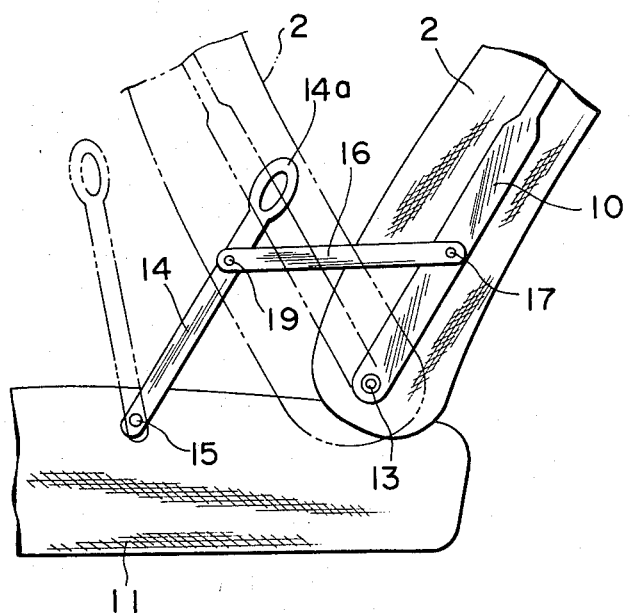
FIG. 7 is a fragmentary side view showing the main link mechanism of a second embodiment of the seat belt device according to the present invention.

In the above-mentioned embodiment, a link lever 16 is used; however, it is possible to use a connection wire in place of the link lever. Also, the link lever 16 is connected between the lower end part 10' of the movable rod 10 and the lower end portion of the belt guide member 14; however, as depicted in FIG. 7, it is possible to connect the link lever 16 between a position above the axle 13 of the movable rod 10 and a position also above the axle 15 of the belt guide member 14 by using pins 17 and 19, respectively.

Figure 8:
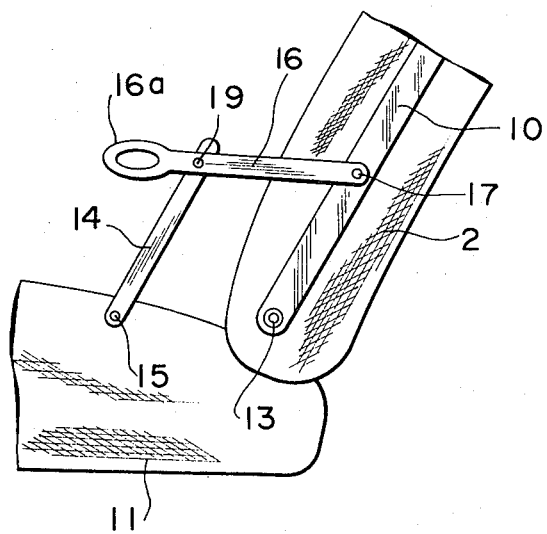
FIG. 8 is a fragmentary side view showing the main link mechanism of a third embodiment of the seat belt device according to the present invention.

Further, as depicted in FIG. 8, it is possible to provide a belt guide portion 16a for the link lever 16.

As described above, since the belt guide member is connected to the frame of the seat back by the use of a link mechanism to move the belt guide member, that is, to move the seat belt forward when the seat back is tilted forward, it is possible to move the belt guide member according to the movement of the seat back to a position where there is clearance between the seat cushion and the seat back, and therefore it is possible to open or close the vehicle side door smoothly without the seat belt being pinched therebetween even when the seat back is tilted forward.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A seat belt device for an automotive vehicle disposed at the side surface of a seat including a seat cushion and a seat back, which comprises:
    (a) a seat belt for protecting a driver or a passenger from injury caused by a shock, one end of said seat belt fixed to the upper rear side of a front door of the vehicle;
    (b) a retractor disposed at a rearmost portion of the middle-side surface of the seat cushion for biasing said seat belt thereinto;
    (c) a movable rod pivotably supported on a rearward portion of the middle-side surface of said seat cushion, said rod connected to said seat back for rotatable movement therewith;
    (d) a belt guide member pivotably supported on said middle-side surface of said seat cushion at a point located forward of the point at which said movable rod is pivotably supported, one end of said belt guide member provided with a belt guideway having an aperture through which said seat belt is passed;
    (e) a pin fixed on the other end of said belt guide member;
    (f) a link lever, one end of which is pivotably connected to the other end of said movable rod and the other end of which is formed with a slot to which said pin is loosely fitted; and
    (g) a belt guide stopper disposed in position on the middle-side surface of the seat cushion for restricting the backward movement of said belt guide member,
    whereby said seat belt is moved back and forth when the seat back is tilted backward and forward and additionally the seat cushion can be moved further backward with said seat belt located at the rearmost position.

* * * * *